(12) United States Patent
Johnson

(10) Patent No.: US 6,471,301 B1
(45) Date of Patent: Oct. 29, 2002

(54) DUAL WHEEL ASSEMBLY DIFFERENTIAL

(75) Inventor: Michael E. Johnson, Rochester, MI (US)

(73) Assignee: Meritor Heavey Vehicle Technology, LLC, Troy, MI (US)

(*) Notice: Subject to any disclaimer, the term of this patent is extended or adjusted under 35 U.S.C. 154(b) by 51 days.

(21) Appl. No.: 09/711,732

(22) Filed: Nov. 14, 2000

(51) Int. Cl.[7] .......................... B60B 11/02; B60B 37/10
(52) U.S. Cl. ...................................... 301/36.2
(58) Field of Search .............................. 301/36.1, 36.2, 301/36.3; 295/37, 44

(56) References Cited

U.S. PATENT DOCUMENTS

| | | | |
|---|---|---|---|
| 1,975,206 A | | 10/1934 | Fuhrman |
| 2,001,875 A | | 5/1935 | Higbee |
| 2,082,292 A | | 6/1937 | Kendall |
| 2,132,029 A | | 10/1938 | Higbee |
| 2,135,568 A | | 11/1938 | Durham et al. |
| 2,192,023 A | | 2/1940 | Ash |
| 2,239,674 A | * | 4/1941 | Frederickson .............. 301/36.2 |
| 2,260,828 A | | 10/1941 | Burger |
| 2,267,362 A | | 12/1941 | Ash |
| 2,397,673 A | | 4/1946 | Lewis |
| 2,398,348 A | | 4/1946 | Ash |
| 2,459,347 A | | 1/1949 | Tolman |
| 2,507,134 A | * | 5/1950 | Ash .......................... 301/36.2 |
| 2,620,235 A | * | 12/1952 | Butler ....................... 301/36.2 |
| 2,727,582 A | | 12/1955 | Lisenby |
| 2,773,723 A | | 12/1956 | Randall |
| 2,935,278 A | | 5/1960 | Lesley |

FOREIGN PATENT DOCUMENTS

GB 515057 11/1939

* cited by examiner

Primary Examiner—Russell D. Stormer
(74) Attorney, Agent, or Firm—Carlson, Gaskey & Olds

(57) ABSTRACT

A differential mechanism is provided for a dual wheel assembly including a spindle having a drive axle defining a first rotational axis. First and second wheels are supported on the spindle adjacent to one another. The wheels are driven by the drive axle and are rotatable relative to one another about the first rotational axis. A gear assembly having a second rotational axis transverse to the first rotational axis mechanically couples the wheels. A biasing assembly engages the gear assembly thereby preventing relative rotation between the wheels when a torque is applied to one of the wheels below a desired amount from a road input. That is, the biasing assembly and gear assembly cooperate with one another to lock the first and second wheels together so that they are driven together about the first rotational axis by the drive axle. This is desirable when the vehicle is traveling a straight path to provide maximum traction. However, when a torque is applied to one of the wheels above the desired amount, such as during a vehicle turn in which scrub commonly occurs, the biasing assembly and gear assembly permit the first and second wheels to rotate relative from one another.

8 Claims, 1 Drawing Sheet

DUAL WHEEL ASSEMBLY DIFFERENTIAL

BACKGROUND OF THE INVENTION

This invention relates to an axle assembly having multiple wheels at each end of an axle, and more specifically, the invention relates to a mechanism permitting relative rotation between the wheels during a turn.

Axle assemblies having dual wheels on either end of the axle have been used to increase the load bearing capability of heavy duty vehicles. Typically the pair of wheels on each end of the axle assembly is secured together so that they rotate together about an axis. Some heavy duty vehicles, such as lift trucks, undergo numerous turning maneuvers which wear the tires significantly. The tire wear is caused when the tires scrub, or drag, since the wheels that are secured together must travel different distances at the inside and outside of the turning radius. Tire wear and maintenance on heavy duty lift trucks due to scrub cost thousands of dollars annually per vehicle.

Dual wheel assembly designs have been proposed that permit the wheels to rotate relative to one another to reduce scrubbing during vehicle turns while driving at least one of the wheels to propel the vehicle. Certain driving conditions require that both wheels be driven to provide enough traction to propel the vehicle and its load. Some designs have been developed which utilize a differential gear set between the wheels so that both wheels may be driven. These designs either permit the wheels to move freely relative to one another, or include complicated devices for locking the wheels together. Moreover, only one of the dual wheels may be driven. Heavy duty vehicles such as lift trucks typically do not have suspensions so that if the non-driven wheel is raised off the ground by a road hazard the driven wheel cannot transmit torque to the road to propel the vehicle. However, prior art designs do not provide a mechanism that will lock wheels together that are rotatable relative to one another for driving and/or braking conditions. Therefore, what is needed is an inexpensive mechanism that permits the wheels to be selectively locked together to provide increased traction and permit the wheels to rotate relative to one another during a turn.

SUMMARY OF THE INVENTION AND ADVANTAGES

The present invention provides a differential mechanism for a dual wheel assembly including a spindle having a drive axle defining a first rotational axis. First and second wheels are supported on the spindle adjacent to one another. The wheels are driven by the drive axle and are rotatable relative to one another about the first rotational axis. A gear assembly having a second rotational axis transverse to the first rotational axis mechanically couples the wheels. A biasing assembly engages the gear assembly thereby preventing relative rotation between the wheels when a torque is applied to one of the wheels below a desired amount from a road input. That is, the biasing assembly and gear assembly cooperate with one another to lock the first and second wheels together so that they are driven together about the first rotational axis by the drive axle. This is desirable when the vehicle is traveling a straight path to provide maximum traction. However, when a torque is applied to one of the wheels above the desired amount, such as during a vehicle turn in which scrub commonly occurs, the biasing assembly and gear assembly permit the first and second wheels to rotate relative from one another.

Accordingly, the above invention provides an inexpensive mechanism that permits the wheels to be selectively locked together to provide increased traction while permitting the wheels to rotate relative to one another during a vehicle turn.

BRIEF DESCRIPTION OF THE DRAWINGS

The FIGURE is a cross-sectional view of the present invention differential dual wheel assembly.

DETAILED DESCRIPTION OF THE PREFERRED EMBODIMENT

Figure 1:
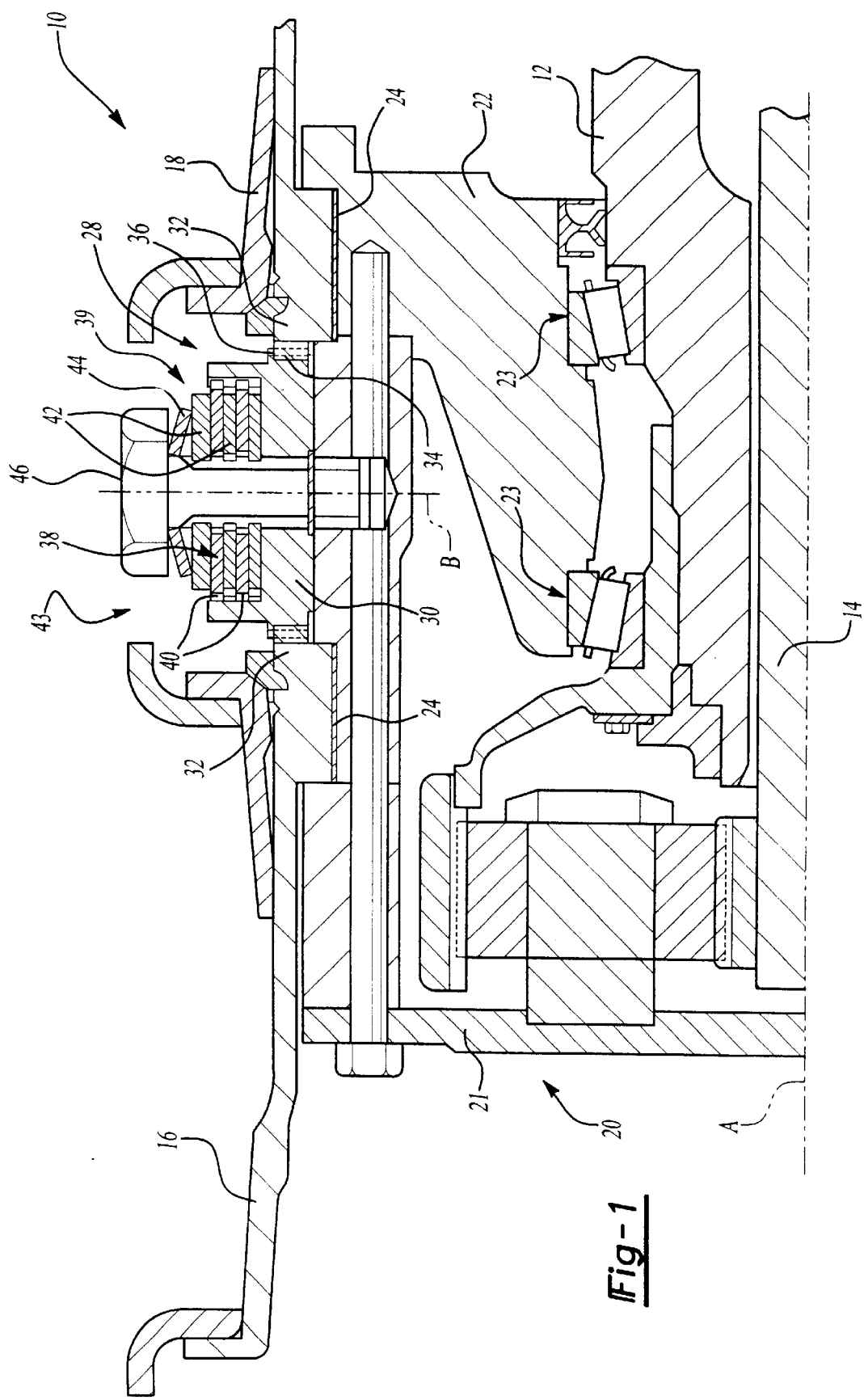

A dual wheel axle assembly 10 is shown in the FIGURE. The axle assembly 10 includes an axle housing 12 defining a spindle at each of the axle's ends. A drive axle 14 is disposed within the spindle 12 and drives first 16 and second 18 wheels about a rotational axis A. Preferably, a planetary gear set 20 is used between the drives haft 14 and the wheels gear 16 and 18 to provide increased torque and greater traction. The wheels 16 and 18 are supported by a gear support 22 carried on bearings 23 supported on the spindle 12. The gear support 22 is connected to a spider 21 of the planetary gear set 20 so that the gear support 22 is driven by the drives haft 14. Bushings 24 are arranged between the gear support 22 and the first 16 and second 18 wheels.

A gear assembly 28 couples the wheels 16 and 18 together for rotation about the axis A. Specifically, the gear assembly 28 includes a gear 30 that mechanically couples ring gears 32 supported on the wheels 16 and 18. Ring gears 32 include teeth 36 that are spaced apart and face one another. Gear 30 includes teeth 34 that mesh with the teeth 36 of the ring gears 32. The gear 30 is rotatable about a rotational axis B, which is transverse to rotational axis A. As the gear 30 rotates about the rotational axis B the wheels 16 and 18 are permitted to rotate relative to one another. Relative rotation of the wheels 16 and 18 is preferable during vehicle turns to reduce tire scrub.

A biasing assembly 39 is arranged within a cavity 38 of the gear 30. The biasing assembly 39 includes a first set of friction disks 40 splined to the interior of the gear 30. A second set of friction disks 42 are arranged in alternating relationship to the first set of friction disks 40 and are splined to the gear support 22 via fastener 46. Preferably, the fastener 46 is a bolt or other threaded device that is received within a threaded aperture within the gear support 22. The gear 30 and first set of friction disks 40 are rotatable about the rotational axis B, which is defined by the fastener 46. The sets of friction disks 40 and 42 are forced into engagement with one another by a tensioning assembly 43, which preferably includes a Bellville washer 44. However, it is understood that the Bellville washer 44 may include any type of spring device or any other suitable mechanism. The tension in the biasing assembly 39 may be adjusted by tightening the fastener 46 thereby increasing the frictional force between the sets of friction disks 40 and 42. The more the fastener 46 is tightened the less the wheels 16 and 18 will slip or rotate relative to one another. Conversely, the looser the fastener 46 is the more the wheels 16 and 18 will slip relative to one another, which is desirable during vehicle turns to avoid tire scrub. Accordingly, the tension is set in the fastener 46 so that when a torque is applied to one of the wheels 16 and 18 below a desired amount from a road input, the wheels 16 and 18 will not rotate relative to one another so that maximum traction is available while the vehicle is traveling down a straight path. Additionally, automated tensioning devices may be incorporated so that the tension is automatically adjusted as the sets of friction disks 40 and 42 wear.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A differential mechanism for a dual wheel assembly, said mechanism comprising:
   a spindle having a drive axle defining a first rotational axis;
   first and second wheels supported on said spindle adjacent to one another, said wheels driven by said drive axle and rotatable relative to one another about said first rotational axis;
   a gear assembly having a second rotational axis transverse to said first rotational axis mechanically coupling said wheels; and
   a biasing assembly engaging said gear assembly preventing relative rotation between said wheels when a torque is applied to one of said wheels below a desired amount from a road input.

2. The mechanism according to claim 1, further including a gear support interconnecting said drive axle and said gear assembly.

3. The mechanism according to claim 2, further including a planetary gear assembly interconnecting said drive axle and said gear support.

4. The mechanism according to claim 1, wherein said biasing assembly produces a force sufficient to prevent relative rotation between said wheels during a generally straight vehicle path, and said biasing member permitting relative rotation between said wheels during a vehicle turn.

5. The mechanism according to claim 2, wherein said biasing assembly comprises first and second sets of friction discs in alternating relationship, said first set of friction discs splined to a gear of said gear assembly and said second set of friction discs splined to said gear support, and said friction discs forced into engagement with one another by a tensioning assembly.

6. The mechanism according to claim 5, wherein said tensioning assembly includes a Bellville washer, and said gear support includes a fastener forcing said washer into engagement with one of said discs.

7. The mechanism according to claim 6, wherein said second set of discs is splined to said fastener.

8. The mechanism according to claim 1, wherein said wheels each include a ring gear facing one another with a gear of said gear assembly coupled there between.

* * * * *

UNITED STATES PATENT AND TRADEMARK OFFICE
CERTIFICATE OF CORRECTION

PATENT NO.   : 6,471,301 B1
DATED        : October 29, 2002
INVENTOR(S)  : Johnson It is certified that error appears in the above-identified patent and that said Letters Patent is hereby corrected as shown below:

Column 4,
Line 8, "tum" should be -- turn --

Signed and Sealed this

Eighteenth Day of February, 2003

JAMES E. ROGAN
*Director of the United States Patent and Trademark Office*